United States Patent

Wheatley

[11] Patent Number: 5,310,238
[45] Date of Patent: May 10, 1994

[54] MOUNTING APPARATUS FOR A TRUCK BED

[76] Inventor: Donald G. Wheatley, 4451 Ford Rd., Ann Arbor, Mich. 48105

[21] Appl. No.: 10,853

[22] Filed: Jan. 29, 1993

[51] Int. Cl.$^5$ .............................. B60P 7/04
[52] U.S. Cl. ......................... 296/100; 296/3
[58] Field of Search ..................... 296/100, 3

[56] References Cited

U.S. PATENT DOCUMENTS

| | | | |
|---|---|---|---|
| 4,527,827 | 7/1985 | Maniscalco et al. | 296/3 |
| 4,936,724 | 6/1990 | Dutton | 410/110 |
| 4,941,705 | 7/1990 | Wurtz | 296/100 |
| 5,121,960 | 6/1992 | Wheatley | 296/100 |
| 5,152,574 | 10/1992 | Tucker | 296/100 |

Primary Examiner—Robert R. Song
Attorney, Agent, or Firm—Harness, Dickey & Pierce

[57] ABSTRACT

An mounting apparatus for a vehicle cargo box is disclosed which provides for attachment of a tonneau cover to cover the cargo box and which provides for attachment of additional accessories to the cargo box above the tonneau cover. The apparatus includes mounting rails for the tonneau cover which are substantially covered by the cover and mounting brackets which are coupled to the rails and extend outward and above the rails for attaching additional accessories to the cargo box above the tonneau cover.

11 Claims, 2 Drawing Sheets

MOUNTING APPARATUS FOR A TRUCK BED

BACKGROUND AND SUMMARY OF THE INVENTION

The present invention relates to an accessory mounting apparatus for a truck bed and in particular to an apparatus for mounting both a tonneau cover to a pick-up truck cargo box and for mounting one or more additional accessories to the cargo box above the tonneau cover.

A tonneau cover is often mounted over the cargo box of certain vehicles such as a pick-up truck to protect the interior of the cargo box and its contents. Tonneau covers are typically mounted to the cargo box by first installing a tonneau rail at the top of each of the cargo box walls. The rails include features for attaching the tonneau cover to the rails in such a manner that the rails are substantially covered by the tonneau cover, leaving the truck and tonneau cover with a neat appearance.

In many instances, however, it is desired to mount additional functional or cosmetic accessories to the cargo box above the tonneau cover. These accessories include such items such as a rear cab spoiler immediately behind the truck cab, a wing at the rear of the cargo box, side rails along the cargo box side walls, a bicycle or ski rack, etc. However, because the tonneau cover overlies the top of the pick-up box walls and the tonneau cover attaching rails, it is difficult or impossible to attach these additional accessories.

Accordingly, it is an object of the present invention to provide an apparatus for mounting to a truck cargo box both a tonneau cover as well as additional accessories above the tonneau cover.

It is a feature of the mounting apparatus of the present invention to provide mounting brackets attached to the tonneau cover rails which extend outward, beneath the tonneau cover, and upwardly therefrom. The brackets provide an attachment point above the cover for the mounting of additional accessories. The mounting brackets include a lower horizontal wall disposed between the bottom wall of the rails and the top surface of the cargo box walls. This horizontal wall portion of the mounting bracket is preferably interfit with the tonneau cover rail so as to couple the mounting brackets to the rails.

In one embodiment of the mounting apparatus, separate clamps are used to clamp the tonneau cover rails to the cargo box. In another embodiment, the clamps are integrally formed with the mounting brackets as a single piece which is attached to the cargo box. The tonneau cover rails are then mounted to the brackets by the interfit connection between the brackets and the rails.

Further objects, features and advantages of the invention will become apparent from a consideration of the following description and the appended claims when taken in connection with the accompanying drawings.

DETAILED DESCRIPTION OF THE INVENTION

Figure 1:
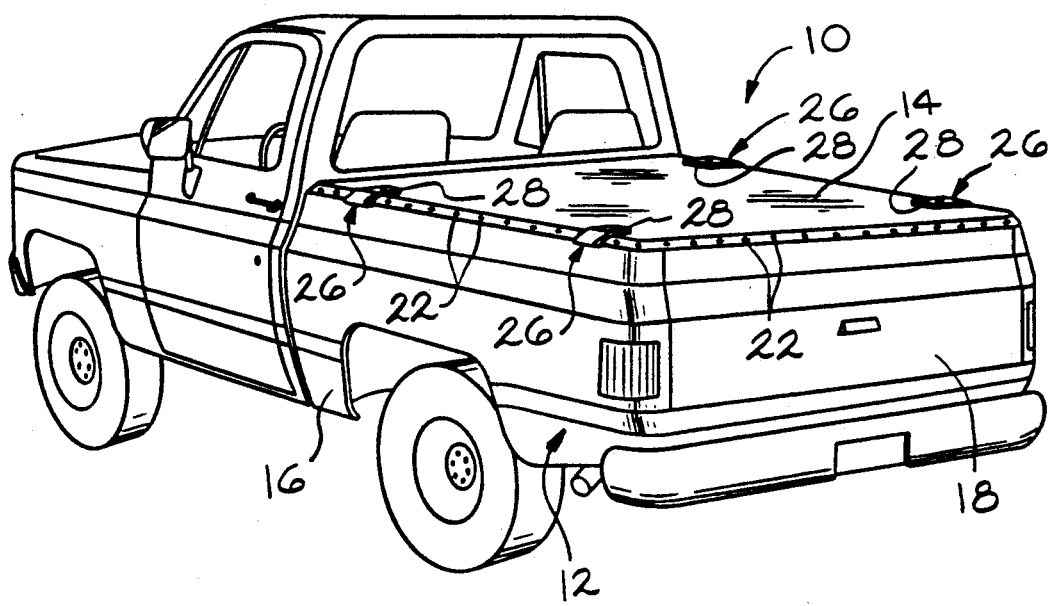
FIG. 1 is a perspective view of a pick-up truck with a tonneau cover mounted to the cargo box using the mounting apparatus of the present invention.
Figure 2:
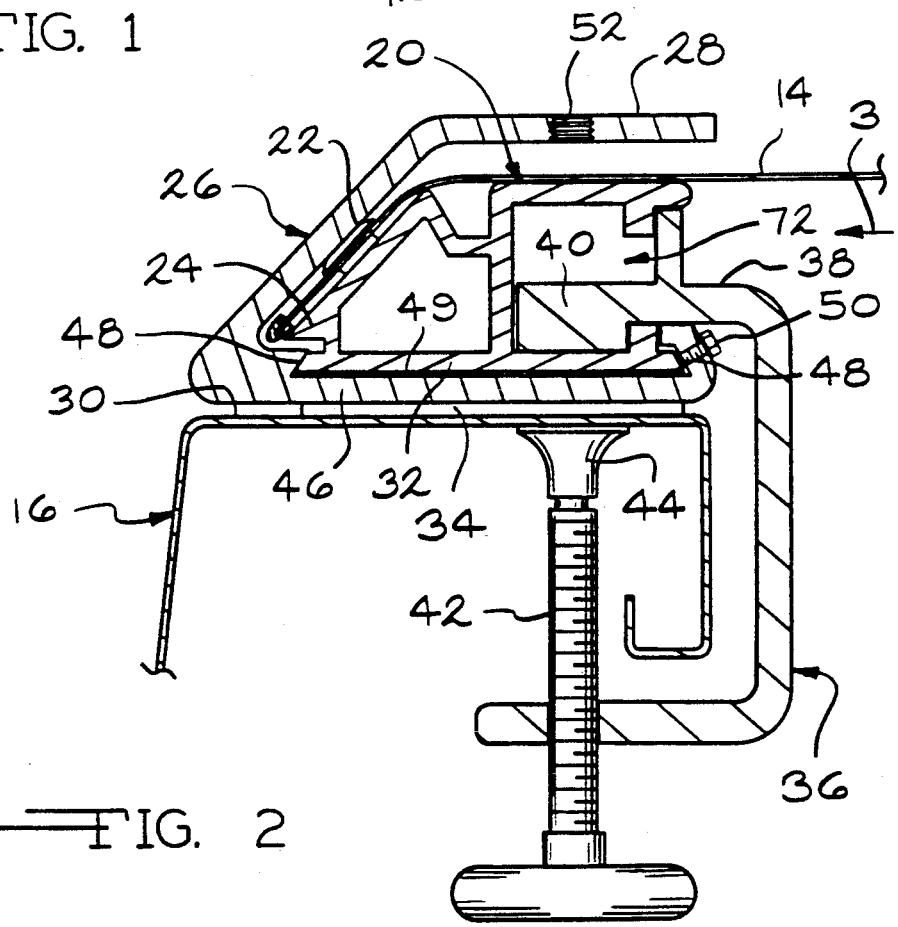
FIG. 2 is a sectional view of the upper portion of the truck cargo box side wall showing the tonneau cover rail and the accessory mounting bracket of the mounting apparatus of the present invention.
Figure 3:
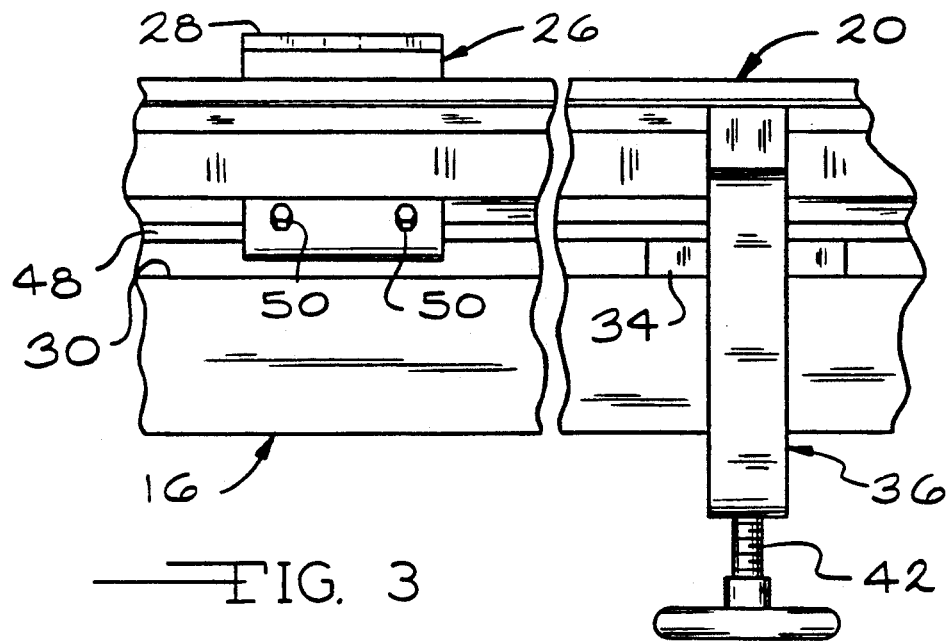
FIG. 3 is a side elevational view of the rail and mounting bracket of FIG. 2 as seen from substantially the arrow 3 of FIG. 2.
Figure 4:
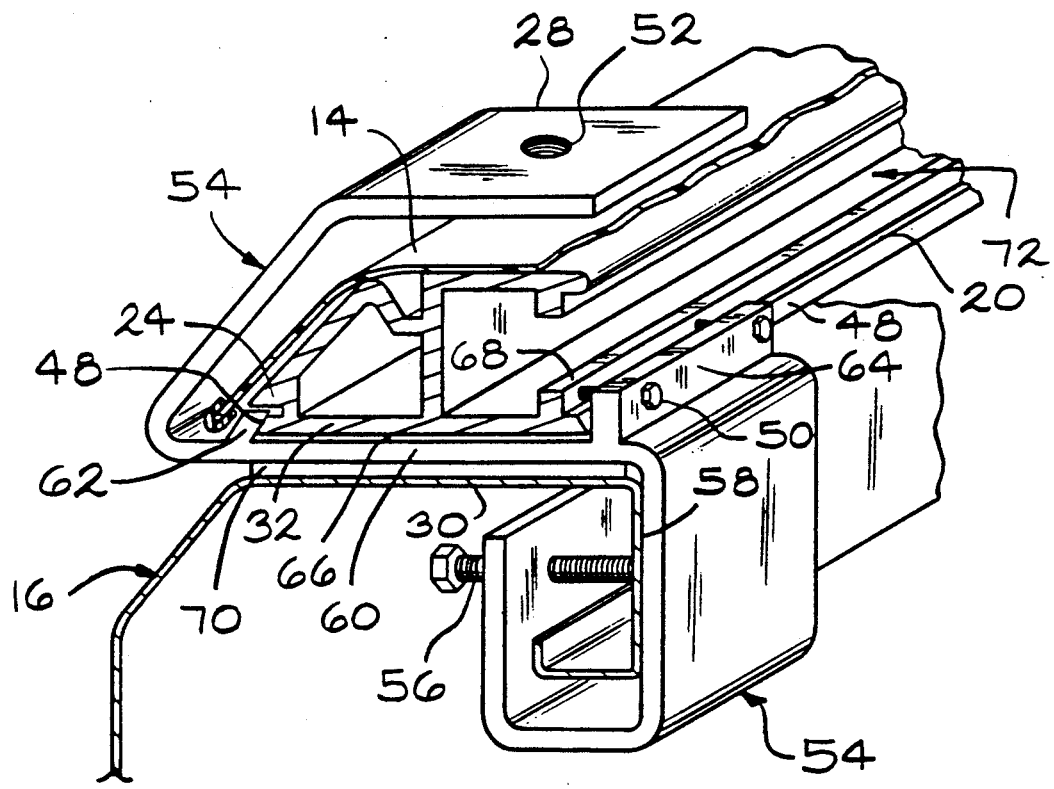
FIG. 4 is a perspective view of an alternative embodiment of the mounting apparatus of the present invention.

Pick-up truck 10 shown in FIG. 1 includes a cargo box 12 which is covered by a tonneau cover 14 attached to the cargo box by the mounting apparatus of the present invention. The cargo box 12 is of conventional construction having an upright wall comprised of a pair of spaced side walls 16, a tailgate 18 and a front wall (not shown). The top of the cargo box wall includes a generally horizontal top surface 30. The tonneau cover rails 20 are mounted above the top surface of the walls as shown in FIGS. 2-4. The tonneau cover 14 is then attached to the rails by snap fasteners 22 spaced about the periphery of the tonneau cover and along the rails 20. Other fasteners besides snaps can be used if desired. Once installed, the tonneau cover 14 extends from the lower outer edge portion 24 of the rails 20, over the rails and across the cargo box. As a result, the rails 20 are substantially concealed by the tonneau cover.

By covering the rails, the tonneau cover interferes with the installation of additional accessories to the cargo box such as a rear cab spoiler, a rear wing, ski rack, side rails, etc. The mounting apparatus of the present invention provides mounting brackets 26 which are attached to the tonneau cover rails 20 and which extend around and over the tonneau cover rails. The brackets provide an attachment platform 28 above the tonneau cover for attaching additional accessories to the cargo box.

One embodiment of the mounting apparatus is disclosed in FIGS. 2 and 3. The tonneau cover rail 20 is mounted to the top horizontal surface 30 of the cargo box side wall 16 by mounting clamps 36 described below. The tonneau cover rail 20 includes a horizontal bottom wall 32 which is spaced above the top surface 30 of the cargo box wall by mounting pads 34 spaced along the rail at regular intervals. The mounting pads 34 can be made of any of a variety of materials but are preferably made of a rigid material that will not mar the painted surface of the cargo box side wall. Various plastic resins can be used. The mounting pads 34 must be rigid enough to maintain the spacing between the side rail and the cargo box under the clamping loads as described below.

A plurality of clamps 36 are used to attach the tonneau cover rail 20 to the cargo box wall at spaced intervals along the lengths of the rails 20. A simple C-clamp is shown in FIG. 2 to represent any of a variety of clamp configurations that can be used. The clamp 36 includes a fixed member 38 which has a jaw 40 engaging the top side of the rail bottom wall 32. A movable clamp member 42, movable relative to the fixed member 38 of a clamp, is rotated into a position where its jaw 44 engages the inner side of the cargo box to clamp the rail 20 to the cargo box wall between the clamp jaws 40 and 44. The terms "fixed" and "movable" for the clamp members describe these members while the clamp is being installed. During installation, the fixed member is engaged with the rail 20 while the movable member is moved relative to the fixed member to install the clamp.

The clamps are positioned at the mounting pads 34 to compress the mounting pads between the cargo box wall and the tonneau cover rail 20. The use of clamps 36 enables the rail 20 and mounting bracket 26 to be mounted to the cargo box without the necessity of drilling holes in the cargo box. If desired, holes could be drilled in the cargo box wall and the mounting apparatus of the present invention bolted to the cargo box.

To avoid interference with the tonneau cover 14, the mounting brackets 26 are attached to the bottom wall 32 of the rail 20. From the bottom wall, the mounting brackets extend outward, beyond the lower outer edge portion 24 of the rail, and from there upward above the tonneau cover 14. Each mounting bracket 26 includes a lower horizontal wall 46 which is shaped complementary to the bottom wall 20 of the side rail for interfitting engagement with the bottom wall, to mount the bracket thereto.

In the embodiment shown in FIGS. 2 and 3, the rail bottom wall 32 is generally trapezoidal in shape with the edges 48 tapering upwardly. The lower wall 46 of the mounting bracket includes a trapezoidal shaped recess 49, open from above, for reception of the trapezoidal shaped bottom wall by sliding the mounting bracket 26 longitudinally passed one end of the rail 20. The complementary trapezoidal shapes enable the mounting bracket to be vertically supported by the rail 20. The mounting bracket 26 is slidable along the length of the rail 20 between adjacent spaced mounting pads 34. When the bracket has been positioned as desired, one or more set screws 50, mounted to the bracket 26, are tightened against the rail 20 to hold the bracket in position on the rail.

From the lower wall 46, the mounting bracket 26 extends upwardly around the lower outer edge portion 24 of the rail to the attaching platform 28 positioned above the tonneau cover 14. The attaching platform 28 includes an internally threaded bore 52 for reception of a mounting bolt or other hardware to attach accessories to the bracket 26.

With reference to FIG. 4, an alternative embodiment of the mounting apparatus of the present invention is described. In the embodiment of FIG. 4, the mounting bracket 26 and the fixed member 38 of the clamp are integrally formed as a unitary member 54. The unitary member 54 is clamped or bolted to the cargo box wall and the tonneau cover rail 20 is attached to the unitary member 54. In the embodiment shown, the unitary member 54 is clamped to the cargo box by a clamping bolt 56 which engages a down turned flange 58 of the cargo box. The member 54 could be bolted to the cargo box if desired.

The rail 20 in FIG. 4 is identical to rail 20 in FIGS. 2 and 3 including the trapezoidal shaped bottom wall 32. The unitary member 54 includes a lower horizontal wall 60 analogous to the lower wall 4 of the mounting bracket 26. The lower wall 60 is formed with a pair of upwardly extending flanges 62 and 64 which, together with the wall 60, form a recess 66 for reception of the trapezoidal bottom wall 32 of the rail 20. The flange 62 is angled to the vertical so as to be parallel to the tapered edge 48 of the rail bottom wall. The flange 64 is substantially upright. Set screws 50 extend through the flange 64 to engage a flange 68 extending upwardly from the rail bottom wall 32. The set screws 50 hold the rail 20 in position relative to the unitary member 54 attached to the cargo box wall. A resilient pad 70 is positioned between the cargo box top surface 30 and the lower horizontal wall 60 of the unitary member 54.

Like the mounting bracket 26, the unitary member 54 extends outwardly from the lower wall 60, around the lower outer edge portion 24 of the rail 20, and upwardly therefrom to an attachment platform 28 above the tonneau cover 14. The attachment platform 28 includes the internally threaded bore 52 for attachment of accessories thereto.

In a preferred embodiment, the rails 20, mounting brackets 26 and unitary members 54 are all anodized aluminum extrusions to present an attractive appearance when these components are visible. The rails 20 also include channels 72 that face toward the interior of the cargo box and can be used to attach accessories within the cargo box when the tonneau cover is not in use.

The mounting apparatus of the present invention thus accomplishes the objective of providing an apparatus for mounting a tonneau cover that also provides for the mounting of additional accessories to the cargo box above the tonneau cover.

It is to be understood that the invention is not limited to the exact construction illustrated and described above, but that various changes and modifications may be made without departing from the spirit and scope of the invention as defined in the following claims.

I claim:

1. A mounting apparatus for attaching accessories to a vehicle cargo box, said cargo box having an upright wall with a generally horizontal top surface, said apparatus comprising:
   a rail mounted to the cargo box above the top surface of the cargo box wall, said rail having an outer edge facing outwardly from the cargo box and means for attaching a tonneau cover also having an outer edge to said rail to extend across said cargo box substantially covering said rail;
   a mounting bracket coupled to said rail and extending outwardly beyond the outer edge of the tonneau cover and upwardly above the tonneau cover, said bracket including means for attaching an accessory thereto above said rail and said tonneau cover; and
   means for attaching said rail and said bracket to said cargo box wall.

2. The apparatus of claim 1 wherein said means for attaching said rail and said bracket to said cargo box wall includes a clamp having a first clamp member stationary relative to said rail and said bracket and a second clamp member movable relative to said first clamp member to clamp a portion of said cargo box wall between said clamp members to mount said clamp, rail and bracket to said cargo box wall.

3. The apparatus of claim 2 wherein said rail has a horizontal bottom wall and said mounting bracket includes a lower horizontal wall disposed between said cargo box wall top surface and said rail bottom wall, said bracket lower wall and said rail bottom wall including means for coupling said rail and said mounting bracket to one another.

4. The apparatus of claim 3 wherein said first clamp member and said mounting bracket are integrally formed as a unitary member.

5. The apparatus of claim 2 wherein said first clamp member and said mounting bracket are integrally formed as a unitary member.

6. The apparatus of claim 5 wherein said rail has a horizontal bottom wall and said unitary member forming said first clamp member and said mounting bracket includes a lower horizontal wall between said cargo box wall top surface and said rail bottom wall, said unitary member lower horizontal wall and said rail bottom wall including means for coupling said rail and said unitary member to one another.

7. A mounting apparatus for a vehicle cargo box having a pair of spaced sidewalls, each sidewall having a generally horizontal top surface, comprising:
- a rail having a horizontal bottom wall and being disposed above said sidewall top surfaces, said rail having a lower outer edge portion facing away from the cargo box and said rail including means for attaching a cover member thereto to extend across said cargo box substantially covering said rail;
- mounting pads for said rail spaced along the length of said rail between said rail bottom wall and said cargo box sidewall top surface for spacing said rail bottom wall from said top surface;
- a mounting bracket coupled to said rail and extending outwardly beyond the outer edge portion of said rail and upwardly above said bottom wall of said rail, said bracket including means for attaching an accessory thereto; and
- means for attaching said rail to said cargo box sidewall.

8. The mounting apparatus for a vehicle of claim 7 wherein said mounting bracket includes a horizontal top platform above said rail and means in said top platform forming an internally threaded bore for reception of bolt for attaching an accessory to said platform.

9. The mounting apparatus for a vehicle of claim 7 wherein said mounting bracket has a lower horizontal wall shaped complementary to the bottom wall of said rail for interfitting engagement with said bottom wall to mount said bracket to said rail.

10. The mounting apparatus for a vehicle of claim 9 wherein said mounting bracket is movable longitudinally along the length of said rail and further comprising means for selectively fixing the longitudinal position of said bracket along said rail.

11. The accessory mounting apparatus for a vehicle of claim 9 wherein said bottom wall is shaped trapezoidally with edges tapering upwardly and said mounting bracket lower wall has a complementarily shaped recess to wrap around said trapezoidally shaped bottom wall to couple said bracket to said rail.

* * * * *